(12) United States Patent
Xu et al.

(10) Patent No.: US 8,489,554 B2
(45) Date of Patent: Jul. 16, 2013

(54) METHODS AND SYSTEMS FOR OPERATING A SEQUENCE OF EVENTS RECORDER

(75) Inventors: Yan Hua Xu, Lake Orion, MI (US); Mark Anthony Lobuono, South Lyon, MI (US); Robert A. Rucinski, Charlottesville, VA (US); Jerry Simons, Northville, MI (US)

(73) Assignee: GE Intelligent Platforms, Inc., Charlottesville, VA (US)

( * ) Notice: Subject to any disclaimer, the term of this patent is extended or adjusted under 35 U.S.C. 154(b) by 1109 days.

(21) Appl. No.: 11/868,158

(22) Filed: Oct. 5, 2007

(65) Prior Publication Data

US 2009/0094259 A1 Apr. 9, 2009

(51) Int. Cl.
*G06F 7/00* (2006.01)
*G06F 17/00* (2006.01)

(52) U.S. Cl.
USPC .......................................... 707/649; 707/654

(58) Field of Classification Search
USPC ........................................................ 707/649
See application file for complete search history.

(56) References Cited

U.S. PATENT DOCUMENTS

| | | | |
|---|---|---|---|
| 4,467,421 A | 8/1984 | White | |
| 5,089,958 A | 2/1992 | Horton et al. | |
| 5,157,663 A | 10/1992 | Major et al. | |
| 5,241,668 A | 8/1993 | Eastridge et al. | |
| 5,410,667 A | 4/1995 | Belsan et al. | |
| 5,455,932 A | 10/1995 | Major et al. | |
| 5,560,352 A | 10/1996 | Heim et al. | |
| 6,584,586 B1 | 6/2003 | McCoy | |
| 6,753,873 B2 * | 6/2004 | Dixon et al. | 345/542 |
| 7,296,125 B2 | 11/2007 | Ohran | |
| 2002/0038200 A1 | 3/2002 | Shimizu | |
| 2006/0048025 A1 * | 3/2006 | Filipovic | 714/724 |
| 2006/0177119 A1 | 8/2006 | McPheely | |
| 2007/0244571 A1 * | 10/2007 | Wilson et al. | 700/11 |

OTHER PUBLICATIONS

Ganesan, Dimensions, Why Do We Need a New Data Handling Architecture for Sensor Networks?, ACM, 2003, pp. 143-148.*

* cited by examiner

*Primary Examiner* — Kimberly Wilson
(74) *Attorney, Agent, or Firm* — Global Patent Operation; Mark Conklin

(57) ABSTRACT

A method for recording a sequence of events is provided. The method includes operating a sequence of events recorder in a normal mode, wherein data stored is related to the sequence of events in a history buffer. The method also includes initiating a snap-shot mode of the events recorder after a triggering event occurs in the sequence of events. The snap-shot mode operates by freezing data related to a moment in the sequence of events that occurred prior to the triggering event, storing data related to the sequence of events at the time of the triggering event in the snap-shot buffer, and continuing to record the data related to the sequence of events to a snap-shot buffer until a predetermined event.

23 Claims, 2 Drawing Sheets

METHODS AND SYSTEMS FOR OPERATING A SEQUENCE OF EVENTS RECORDER

BACKGROUND OF THE INVENTION

This invention relates generally to events recording systems, and more particularly, to methods and systems for operating a sequence of events recorder.

Known events recorders used to record events during system processing generally include at least a memory and a controller, such as a programmable logic controller. For example, events may be recorded during a manufacturing process and/or a power generation process. Known programmable logic controllers include an input channel that receives a signal indicative of a state of the manufacturing process and/or power system process. This signal is commonly referred to as the input channel state.

To monitor operation of the events recorder, external hardware and/or electronic modules are used to detect and record changes in the input channel state. Specifically, at least some external hardware is used to monitor the input channel state for changes, such as a rising and/or falling edge. Such changes in the input channel state may be indicative of a crisis point, or critical point, in the manufacturing process and/or power system. To properly monitor the manufacturing process and/or power system, there is generally a need to continuously know the input channel state during the manufacturing process and/or power system operation. As a result, known recording processes may require a substantially large memory space and/or may cause data communication traffic burdens.

BRIEF DESCRIPTION OF THE INVENTION

In one aspect, a method for recording a sequence of events is provided. The method includes operating a sequence of events recorder in a normal mode, wherein data stored is related to the sequence of events in a history buffer. The method also includes initiating a snap-shot mode of the events recorder after a triggering event occurs in the sequence of events. The snap-shot mode operates by freezing data related to a moment in the sequence of events that occurred prior to the triggering event, storing data related to the sequence of events at the time of the triggering event in the snap-shot buffer, and continuing to record the data related to the sequence of events to a snap-shot buffer until a predetermined event.

In another aspect, a sequence of events recorder for providing a snap-shot of a sequence of events is provided. The sequence of events recorder includes a history buffer for storing data, a snap-shot buffer for storing data, and a controller configured to operate the sequence of events recorder in one of a normal mode and a snap-shot mode. The snap shot mode is initiated by a triggering event in the sequence of events. During the normal mode the sequence of events recorder stores data related to the sequence of events in the history buffer. During the snap-shot mode the sequence of events recorder freezes data related to a moment in the sequence of events that occurred prior to the triggering event, stores data related to the sequence of events at the time of the triggering event is stored in the snap-shot buffer, and continues to record data related to the sequence of events to the snap-shot buffer until a predetermined event.

In yet another aspect, a power system is provided. The power system includes a component and a sequence of events recorder for providing a snap-shot of a sequence of events related to the component. The sequence of events recorder includes a history buffer for storing data, a snap-shot buffer for storing data, and a controller configured to operate the sequence of events recorder in one of a normal mode and a snap-shot mode. The snap shot mode initiated by a triggering event in the sequence of events. During the normal mode the sequence of events recorder stores data related to the sequence of events in the history buffer. During the snap-shot mode the sequence of events recorder freezes data related to a moment in the sequence of events that occurred prior to the triggering event, stores data related to the sequence of events at the time of the triggering event is stored in the snap-shot buffer, and continues to record data related to the sequence of events to the snap-shot buffer until a predetermined event.

DETAILED DESCRIPTION OF THE INVENTION

The present invention provides an events recorder for providing a snap-shot of a sequence of events. Specifically, in the exemplary embodiment, the recorder enables a snap-shot of events related to the equipment of a power system to be analyzed. Moreover, in the exemplary embodiment, the sequence of events recorder includes a history buffer, a snap-shot buffer, and a controller and/or processor. The controller operates the sequence of events recorder in either a normal mode or a snap-shot mode, as described in more detail below.

It should be noted that although the present invention is described with respect to power systems, as will be appreciated by one of ordinary skill in the art, the present invention may also apply to any system and/or manufacturing process. Further, although the present invention is described with respect to processors and controllers, as will be appreciated by one of ordinary skill in the art, the present invention may also apply to any system and/or program that operates as described herein. As used herein, the term processor is not limited to just those integrated circuits referred to in the art as processors, but broadly refers to computers, processors, microcontrollers, microcomputers, programmable logic controllers, application specific integrated circuits, and other programmable circuits. The processor may be part of a computer that may include a device, such as; a floppy disk drive or compact disc-read-only memory (CD-ROM) drive, for reading data from a computer-readable medium, such as; a floppy disk, a CD-ROM, a magneto-optical disk (MOD), or a digital versatile disc (DVD).

Figure 1:
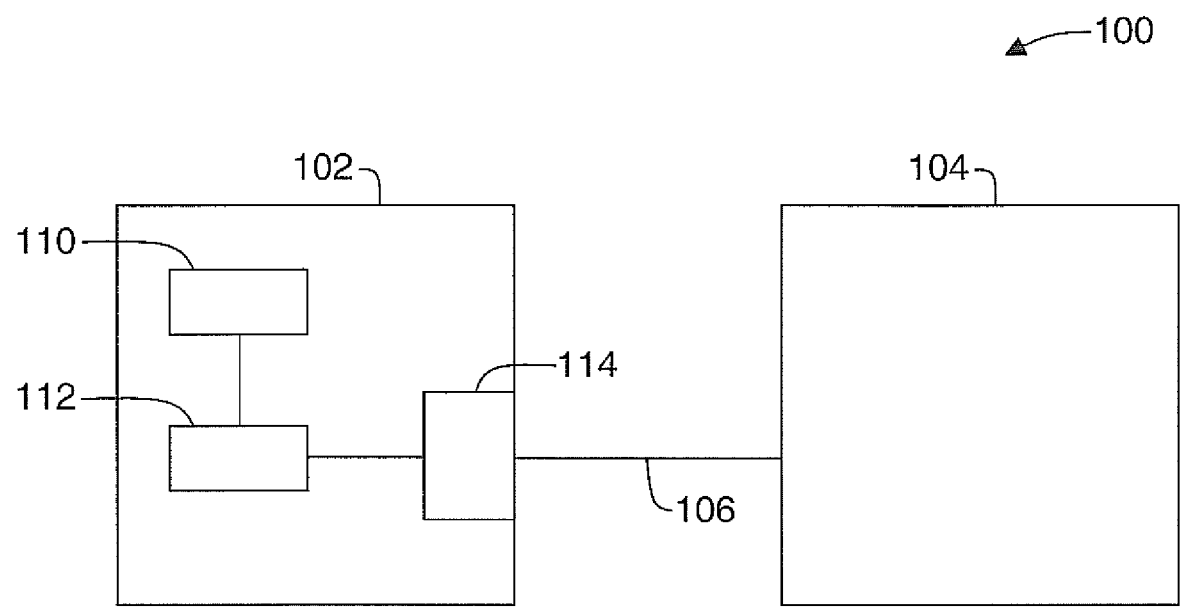
FIG. 1 is a schematic view of an exemplary system including an events recorder.

FIG. 1 is a schematic view of an exemplary system 100 that includes a state of events recorder 102. Specifically, system 100 includes a state of events recorder 102 that is electronically coupled to an industrial system 104. In the exemplary embodiment, industrial system 104 includes a manufacturing process, a power system, and/or any other industrial system that can be monitored by a state of events recorder, as described herein. In the exemplary embodiment, system 104 is electronically coupled to recorder 102 via a cable 106. However, as should be appreciated by one of ordinary skill in the art, system 104 may be remotely located from recorder 102 and communicate with recorder 102 wirelessly.

In the exemplary embodiment, recorder 102 includes a memory device 110 and a controller 112 that includes an input channel 114. During operation, input channel 114 receives a signal from system 104 that is indicative of a state of system 104. The signal from system 104 is commonly referred to as the input channel state. The input channel state is monitored by controller 112 to detect changes in the input channel state, such as a rising and/or falling edge. Such changes in the input channel state may be indicative of a crisis point, or a critical point, in system 104. In the exemplary embodiment, "crisis point" is defined as any instability and/or malfunction in system 104. Accordingly, when such changes are monitored, controller 112 notifies an operator of the change. Further, the input channel state and any changes thereof are recorded to memory device 110. In known environments, it is desirable to know the inputs states continually, for example, in every one millisecond interval/resolution for a specified time period. However, ordinary sequence of events systems are not capable of providing such data.

Figure 2:
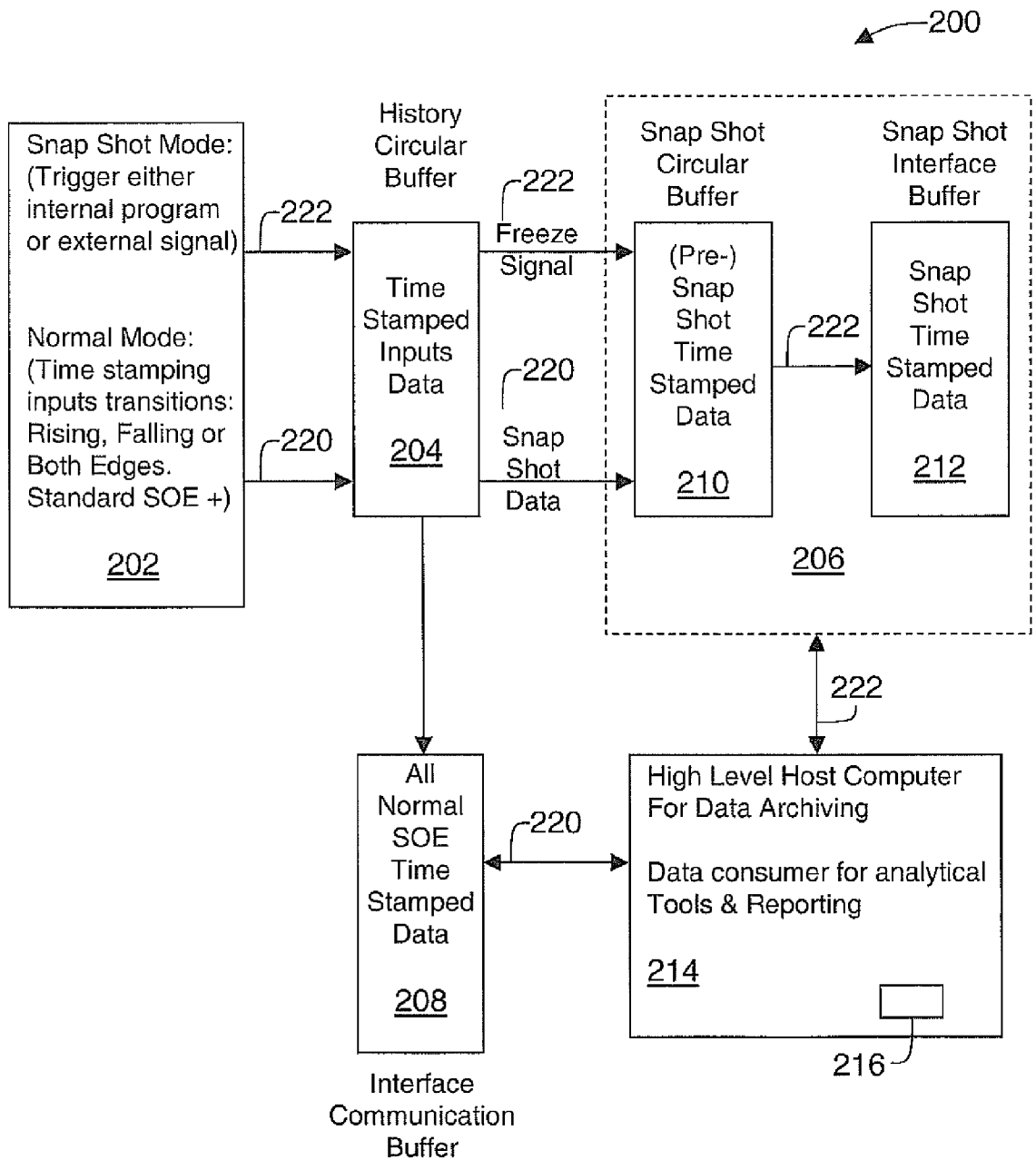
FIG. 2 is a schematic view of an exemplary events recorder that may be used with the system shown in FIG. 1.

FIG. 2 is a schematic view of an exemplary events recorder 200 that may be used with system 100. In the exemplary embodiment, events recorder 200 includes a controller 202, a history circular buffer 204, a snap-shot buffer 206, and an interface buffer 208. Moreover, in the exemplary embodiment, snap-shot buffer 206 includes a circular buffer 210 and an interface buffer 212. In an alternative embodiment, events recorder 200 may operate with only one memory buffer to fulfill the snap shot function. In yet another embodiment, events recorder 200 may operate with any number of buffers suitable to fulfill the snap shot function. Furthermore, events recorder 200 is electronically coupled to a computer 214 that includes a database 216 that stores information received from recorder 200. Controller 202 includes an input channel 218 that receives an input channel state from a system, such as system 104 shown in FIG. 1. Controller 202 is configured to operate in either a normal mode 220 or a snap-shot mode 222. In one embodiment, the events recorder 200 is implemented in a hardware system, for example, an independent device. In an alternative embodiment, events recorder 200 is implemented in a software system, for example, a software function block imbedded in a programming logic controller and/or computer.

In the normal mode 220, controller 202 monitors the input channel state for rising and/or falling edges that may be indicative of a crisis point of system 104. In particular, controller 202 records and time stamps the sequence of events based on the input channel state. History circular buffer 204 stores events based on specified changes in the input channel state. Specifically, when the input channel state experiences a rise and/or fall of an edge, the event is stored in history buffer 204. Such events are transferred to computer 214 and are stored in database 216.

Further, during normal mode 220, snap-shot buffer 206 rolls over and time stamps both rise and fall changes in the input channel state and waits for a snap-shot triggering event. In the exemplary embodiment, the triggering event is an event in the sequence of events that initiates the snap-shot mode 222 of controller 202. In one embodiment, the triggering event is based on a predetermined change in the sequence of events. In another embodiment, the triggering event is generated by the sequence of events recorder based on the lapsing of a predetermined amount of time and/or any other event that is suitable for triggering snap-shot mode 222.

During snap-shot mode 222, controller 202 "freezes" snap-shot buffer 206 and stores data that occurred for a predetermined time prior to the triggering event. In the exemplary embodiment, "freezing" is defined as stopping roll over or saving the data which are recorded in snap shot buffer. The input channel state at the time of the triggering event is stored as initializing data. The initializing data is then used to decipher input transmissions before the triggering event and after the triggering event as controller 202 continues to time stamp both rise and fall changes of the input channel state. A snap-shot initializing flag is inserted to indicate the snap-shot initializing data. The input state changes recorded in snap shot buffer 206 are then transferred to computer 214 and stored in database 216.

Controller 202 returns to normal mode 220 after the triggering event is cleared. In one embodiment, the triggering event is cleared when a second triggering event occurs. In another embodiment, the triggering event is cleared after a predetermined period of time. Accordingly, the data recorded during the snap-shot mode is compressed. Specifically, based on the start point of the snap-shot initializing data, the data before the triggering event (i.e. data recorded in the snap-shot buffer that is in limited time based on the size of the snap-shot buffer) and data after the triggering event (i.e. data recorded in either the history or snap-shot buffer that will be available as long as the trigger is not cleared) can be interpreted in the resolution of any time interval based on the inputs scan frequency (e.g. one millisecond) as a continuous data capture cycle.

In the exemplary embodiment, the length of snap shot mode 222, the snap shot recording triggering conditions, and the selection of snap shot inputs can be based on different application environments. Moreover, the triggering event to start the snap shot recording can be internal from controls and/or from external inputs. Snap shot mode 222 contains the snap shot data both before the triggering event and after the triggering event. The inputs state at the time of the triggering event is stored as the initializing data. This initializing data is the basis used to decipher the input transitions to get all the inputs states in any time interval during a snap shot mode recording time window. This snap shot system provides full spectrum and detailed information of the input states within a predetermined time period before and after the crisis point (triggering event) for crisis diagnostics and root cause analysis.

In one method of operating snap-shot mode 222, the inputs states in every one millisecond are recorded for a period of time based on the trigger condition. In a second method of operating snap-shot mode 222, both rising and falling edge changes of the inputs are recorded. The following chart illustrates how this method interprets the input in the resolution of one millisecond.

| Snap Shot Buffer (two channels as example) | | | | |
|---|---|---|---|---|
| Time | Channel one input states | Channel two input states | Action | notes |
| 09/01/2007/01 h:01 m:01 s:030 ms | | Falling edges | | |
| 09/01/2007/01 h:01 m:01 s:090 ms | On (this is the current | OFF (this is the current | Start Snap | Be called the initialization |

-continued

| Snap Shot Buffer (two channels as example) | | | | |
|---|---|---|---|---|
| Time | Channel one input states | Channel two input states | Action | notes |
| | state recorded) | state recorded Rising edge | Shot | point/data |
| 09/01/2007/01 h:01 m:01 s:195 ms | | | | |
| 09/01/2007/01 h:01 m:01 s:245 ms | | | Stop Snap shot | |

(Rising edge = OFF→On; Falling edge = On→OFF)

Accordingly, the snap shot is triggered at the time of 090 ms. The inputs state of that moment are recorded and stored as "initialization data". From the "initialization data" both edge changes that are recorded are combined, such that the inputs states can be interpreted in every one millisecond resolution as illustrated in the following chart:

| Time | Channel one | Channel Two |
|---|---|---|
| 09/01/2007/01 h:01 m:01 s:001 ms | On | On |
| 09/01/2007/01 h:01 m:01 s:002~028 ms | On . . . | On . . . |
| 09/01/2007/01 h:01 m:01 s:029 ms | On | On |
| 09/01/2007/01 h:01 m:01 s:030 ms | On | OFF |
| 09/01/2007/01 h:01 m:01 s:031 ms | On | OFF |
| 09/01/2007/01 h:01 m:01 s:032~088 ms | On . . . | OFF . . . |
| 09/01/2007/01 h:01 m:01 s:089 ms | On | OFF |
| 09/01/2007/01 h:01 m:01 s:090 ms | On | OFF |
| 09/01/2007/01 h:01 m:01 s:091 ms | On | OFF |
| 09/01/2007/01 h:01 m:01 s:092~193 ms | On . . . | OFF . . . |
| 09/01/2007/01 h:01 m:01 s:194 ms | On | OFF |
| 09/01/2007/01 h:01 m:01 s:195 ms | On | On |
| 09/01/2007/01 h:01 m:01 s:196 ms | On | On |
| 09/01/2007/01 h:01 m:01 s:197~244 ms | On . . . | On . . . |
| 09/01/2007/01 h:01 m:01 s:245 ms | On | On |

In the first method, 245 records will be stored in the buffer. However, in the second method only 3 records are stored in the buffer. It should be noted that the actual number of records will depend on how many times the input states change.

The present invention provides a snap shot mode that facilitates enhancing a sequence of events recording system to enable a full inputs state for crisis diagnostics and root case analysis. The snap shot recorded data is stored in a compressed format to prevent a need for large memory space and data communication traffic. Further, the freeze mechanism of snap shot recording enables the availability of stored inputs state before the snap shot triggering event and not just the snap shot inputs state recorded only after the trigger point. Because the inputs state stored at the moment of snap shot trigger point can be used as the initializing data the inputs state provide a basis to make deciphering the compressed inputs states possible. Moreover, the present invention provides, two recording modes for the snap shot enhanced sequence of events system, a first is a normal sequence of events mode, and the second is a snap shot mode, in which the snap shot mechanism is seamlessly combined with the sequence of events system. In addition, the present invention provides a simple state machine to control the recording modes.

In one embodiment, a method for recording a sequence of events is provided. The method includes operating a sequence of events recorder in a normal mode, wherein data stored is related to the sequence of events in a history buffer. The method also includes initiating a snap-shot mode of the events recorder after a triggering event occurs in the sequence of events. The snap-shot mode operates by freezing data related to a moment in the sequence of events that occurred prior to the triggering event, storing data related to the sequence of events at the time of the triggering event in the snap-shot buffer, and continuing to record the data related to the sequence of events to a snap-shot buffer until a predetermined event. In one embodiment, the sequence of events recorder records data related to a state of a component in a system during a series of system events. Specifically, the system may include a manufacturing system and/or a power system.

In one embodiment, the method includes organizing the data stored in the history buffer based on changes in the sequence of events. In another embodiment, the method includes resetting the sequence of events recorder to the normal mode after the predetermined event has elapsed. In yet another embodiment, the method also includes continuing to record the data related to the sequence of events to the snap-shot buffer until at least one of a second triggering event occurs and a predetermined period of time has elapsed. In one embodiment, initiating a snap-shot mode of the sequence of events recorder after a triggering event includes initiating a snap-shot mode of the sequence of events recorder after at least one of a predetermined change in the sequence of events and a trigger internally generated by the sequence of events recorder. Another embodiment includes compressing the data stored during the snap-shot mode to reduce an amount of memory required to store the data.

As used herein, an element or step recited in the singular and proceeded with the word a or an should be understood as not excluding plural said elements or steps, unless such exclusion is explicitly recited. Furthermore, references to one embodiment of the present invention are not intended to be interpreted as excluding the existence of additional embodiments that also incorporate the recited features.

Exemplary embodiments of systems and methods for operating a sequence of events recorder are provided. The systems and methods illustrated are not limited to the specific embodiments described herein, but rather, components of the system may be utilized independently and separately from other components described herein. Further, steps described in the method may be utilized independently and separately from other steps described herein.

While the invention has been described in terms of various specific embodiments, those skilled in the art will recognize that the invention can be practiced with modification within the spirit and scope of the claims.

What is claimed is:

1. A method for recording a sequence of events in a system, said method comprising:

operating a sequence of events recorder in a normal mode;
receiving a signal by the sequence of events recorder via an input channel configured to have one of a first state and a second state related to the sequence of events;
changing a state of the input channel based on at least one event in the sequence of events;
storing data related to the change in the state of the input channel in a history buffer; and
initiating a snap-shot mode of the sequence of events recorder after a first triggering event occurs in the sequence of events, wherein the snap-shot mode operates by:
 freezing data related to a moment in the sequence of events that occurred prior to the first triggering event;
 storing data related to the sequence of events at the time of the first triggering event in a snap-shot buffer;
 continuing to store the data related to the sequence of events in the snap-shot buffer until a second predetermined triggering event occurs in the sequence of events; and
 resetting the sequence of events recorder to the normal mode after the second predetermined triggering event has occurred.

2. A method in accordance with claim 1 wherein changing the state of the input channel is further based on data related to a state of a component in the system.

3. A method in accordance with claim 1 further comprising organizing the data stored in the history buffer based on changes in the sequence of events.

4. A method in accordance with claim 1 wherein continuing to store the data related to the sequence of events in the snap-shot buffer further comprises continuing to store the data related to the sequence of events in the snap-shot buffer until at least one of the second triggering event has occurred and a predetermined period of time has elapsed.

5. A method in accordance with claim 1 wherein initiating a snap-shot mode of the sequence of event recorder after a first triggering event further comprises initiating a snap-shot mode of the sequence of events recorder after at least one of a predetermined change in the sequence of events and a trigger internally generated by the sequence of events recorder.

6. A method in accordance with claim 1 further comprising compressing the data stored during the snap-shot mode.

7. A method in accordance with claim 1 further comprising:
 utilizing the data related to the sequence of events at the time of the first triggering event to determine the state of the input channel.

8. A method in accordance with claim 1, further comprising:
 compressing the data stored during the snap-shot mode; and
 utilizing the data related to the sequence of events at the time of the first triggering event to decipher the compressed data.

9. A sequence of events recorder for recording a sequence of events in a system, said sequence of events recorder comprising:
 an input channel, configured to have one of a first state and a second state, an input channel state being further configured to change from the first state to the second state, wherein the change is based on at least one event in the sequence of events in the system;
 a memory comprising a computer-readable medium, said memory further comprising a history buffer for storing data and a snap-shot buffer for storing data; and
 a controller in operable communication with said input channel, said controller configured to operate said sequence of events recorder in one of a normal mode and a snap-shot mode, the snap-shot mode initiated by a first triggering event that occurs in the sequence of events, wherein during the normal mode said sequence of events recorder stores data related to the sequence of events in said history buffer, and during the snap-shot mode said sequence of events recorder freezes data related to a moment in the sequence of events that occurred prior to the first triggering event, stores data related to the sequence of events at the time of the first triggering event in said snap-shot buffer, and continues to record data related to the sequence of events in said snap-shot buffer until a second predetermined triggering event, said controller further configured to reset said sequence of events recorder to the normal mode after the second predetermined triggering event has occurred.

10. A sequence of events recorder in accordance with claim 9 wherein a change in the input channel state is further related to a state of a component in the system.

11. A sequence of events recorder in accordance with claim 9 wherein said history buffer is configured to organize data based on changes in the sequence of events.

12. A sequence of events recorder in accordance with claim 9 wherein said controller is configured to reset said sequence of events recorder to the normal mode after at least one of the second triggering event has occurred and a predetermined period of time has elapsed.

13. A sequence of events recorder in accordance with claim 9 wherein the first triggering event includes at least one of a predetermined change in the sequence of events and a trigger internally generated by said sequence of events recorder.

14. A sequence of events recorder in accordance with claim 9 wherein said sequence of events recorder is configured to compress the data stored during the snap-shot mode.

15. A sequence of events recorder in accordance with claim 9, wherein said controller is further configured to utilize the data related to the sequence of events at the time of the first triggering event to determine the state of said input channel.

16. A sequence of events recorder in accordance with claim 9, wherein said controller is further configured to compress the date stored during the snap-shot mode, and utilize the data related to the sequence of events at the time of the first triggering event to decipher the compressed data.

17. A power system comprising:
 at least one component; and
 a sequence of events recorder configured to record a sequence of events related to said at least one component, said sequence of events recorder comprising:
  an input channel, configured to have one of a first state and a second state, said input channel being further configured to change from said first state to said second state, wherein said change is based on at least one event in the sequence of events in the system;
  a memory comprising a computer-readable medium, said memory further comprising a history buffer for storing data and a snap-shot buffer for storing data; and
  a controller configured to operate said sequence of events recorder in one of a normal mode and a snap-shot mode, the snap-shot mode initiated by a first triggering event in the sequence of events, wherein during the normal mode said sequence of events recorder stores data related to the events in said history buffer, and during the snap-shot mode said sequence of events recorder freezes data related to a moment in the sequence of events that occurred prior to the first triggering event, stores data related to the sequence of events at the time of the first triggering event in said snap-shot buffer, and continues to record data related to the sequence of events in said snap-shot buffer until a second predetermined triggering event, said controller further configured to reset said sequence of events recorder to the normal mode after the second predetermined triggering event has occurred.

18. A power system in accordance with claim 17 wherein a change in the input channel state is further related to a state of said at least one component.

19. A power system in accordance with claim 17 said controller is configured to reset said sequence of events recorder to the normal mode after at least one of the second triggering event has occurred and a predetermined period of time has elapsed.

20. A power system in accordance with claim 17 wherein the first triggering event includes at least one of a predetermined change in the sequence of events and a trigger internally generated by said sequence of events recorder.

21. A power system in accordance with claim 17 wherein said sequence of events recorder is configured to compress the data stored during the snap-shot mode.

22. A power system in accordance with claim 17, wherein said controller is further configured to utilized the data related to the sequence of events at the time of the first triggering event to determine the state of said input channel.

23. A power system in accordance with claim 17, wherein said controller is further configured to compress the data stored during the snap-shot mode, and utilize the data related to the sequence of events at the time of the first triggering event to decipher the compressed data.

\* \* \* \* \*

UNITED STATES PATENT AND TRADEMARK OFFICE
CERTIFICATE OF CORRECTION

PATENT NO. : 8,489,554 B2  
APPLICATION NO. : 11/868158  
DATED : July 16, 2013  
INVENTOR(S) : Xu et al.

Page 1 of 1

It is certified that error appears in the above-identified patent and that said Letters Patent is hereby corrected as shown below:

In the Claims:

In Column 7, Line 38, in Claim 5, delete "event" and insert -- events --, therefor.

Signed and Sealed this  
Third Day of September, 2013

Teresa Stanek Rea  
*Acting Director of the United States Patent and Trademark Office*